United States Patent [19]

Hirasa

[11] Patent Number: 5,072,229
[45] Date of Patent: Dec. 10, 1991

[54] WINDSHIELD ANTENNA FOR AN AUTOMOTIVE VEHICLE

[75] Inventor: Yoshiaki Hirasa, Hiroshima, Japan

[73] Assignee: Mazda Motor Corporation, Hiroshima, Japan

[21] Appl. No.: 380,391

[22] Filed: Jul. 17, 1989

[30] Foreign Application Priority Data

Jul. 18, 1988 [JP] Japan .................. 63-094925[U]

[51] Int. Cl.$^5$ .............................................. H01Q 1/32
[52] U.S. Cl. ................................................... 343/713
[58] Field of Search ................ 343/713, 704, 711, 712

[56] References Cited

U.S. PATENT DOCUMENTS 3,766,563 10/1973 Sauer et al. ...................... 343/713
3,810,180 5/1974 Kunert et al. ..................... 343/713
3,971,030 7/1976 Sauer ................................. 343/713
4,329,691 5/1982 Prewitt .............................. 343/713
4,727,377 2/1988 Yotsuya et al. .................... 343/713

*Primary Examiner*—Michael C. Wimer
*Attorney, Agent, or Firm*—Fleit, Jacobson, Cohn, Price, Holman & Stern

[57] ABSTRACT

Windshield antenna for an automotive vehicle having a plurality of different length windshield wires which are disposed along the periphery of the windshield glass. The windshield wires are arranged in parallel. Except for the longest antenna wire, each antenna wire has a dummy antenna wire on its extension line. Each dummy antenna wire terminates at the same position in the longitudinal direction along the periphery of the windshield glass so as to provide different length windshield antenna wires for realizing the wide-range and high-sensitive receiving characteristic without losing attractiveness and keeping a good look.

15 Claims, 5 Drawing Sheets

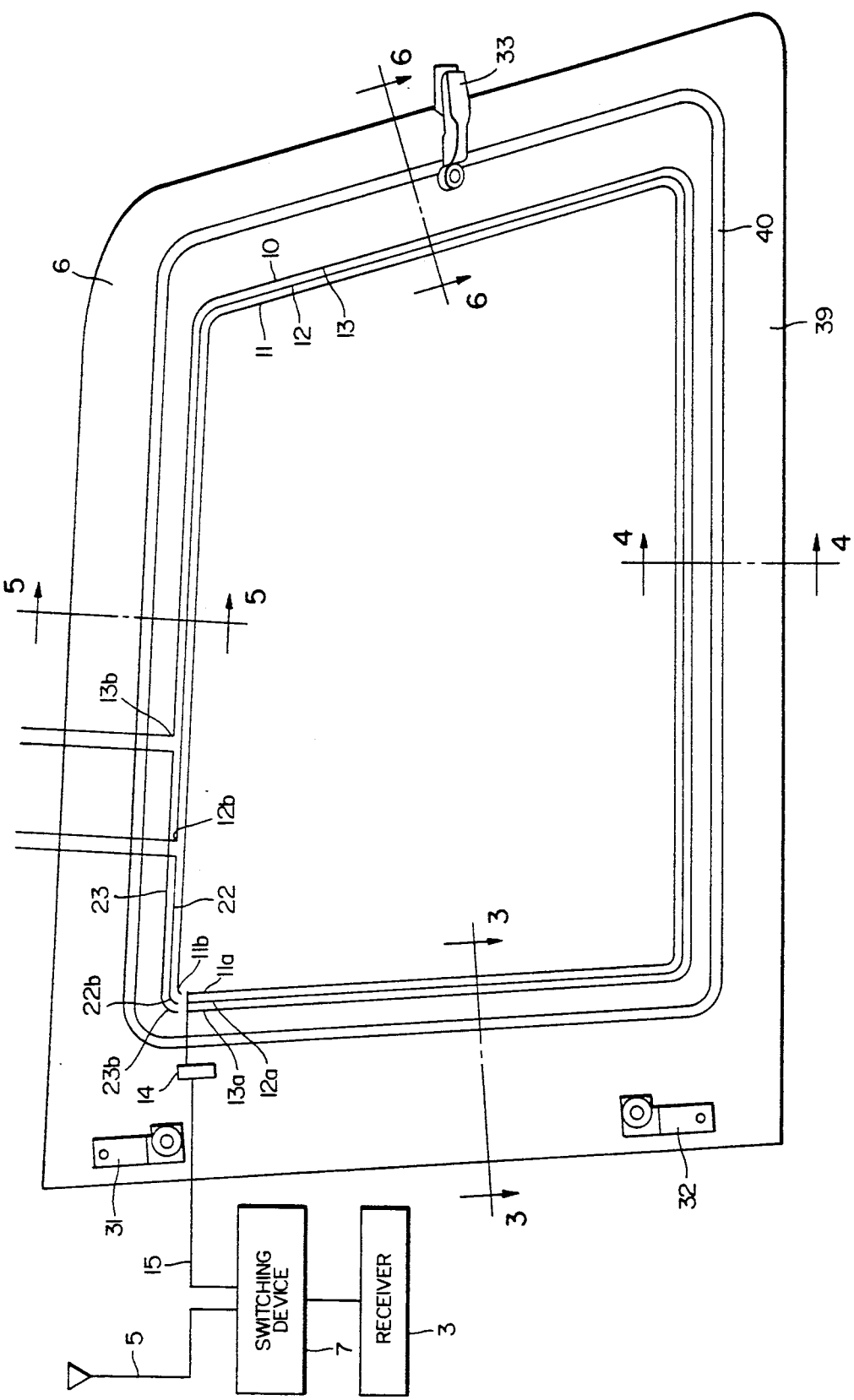

(f = 88MHz)

(f = 98MHz)

(f = 108MHz)

WINDSHIELD ANTENNA FOR AN AUTOMOTIVE VEHICLE

BACKGROUND OF THE INVENTION

1. Field of the Invention

This invention relates to a windshield antenna for an automotive vehicle, particularly to a layout or an arrangement of the antenna.

2. Description of Prior Art

Conventionally, an automobile has an antenna to receive signals of radio broadcast wave, such as frequent modulation wave (FM) or amplitude modulation wave (AM). When the automobile is running in mountain areas or in city areas crowded by high-rise buildings, a radio wave receiver in the automobile causes a noise by steep fluctuation of electrical wave field or a multipass distortion especially in case of FM radio waves. One effective way to resolve such a problem is to install a plurality of antennae on the vehicle body and to select and connect the most suitable or sensitive antenna to the radio broadcast receiver. This method is generally known as a so-called diversity receiver system.

In view of the sensitivity of antennas, a pole antenna is more preferable than other antennas to install on the vehicle body; however, to build many pole antennas is not desirable in view of the design or layout of vehicle body. In such a case, there has been used a windshield antenna array which has antenna wires located on the windshield glass. For example, Japanese Laid-open Utility Model Application 58-61509 shows windshield glasses having windshield antennas at opposite rear sides of the vehicle body, and proposes to select one of two antennas for the diversity receiver system.

It is also well known that the characteristic of an antenna is determined by the length of the antenna, that is, its most sensitive band is limited in a particular frequency zone or band. In other words, a predetermined length antenna has an inherently low sensitivity characteristic with respect to other particular frequency zones or bands.

Such an antenna characteristic does not affect the performance of radio so much in case of using a pole antenna. However, in case of using a windshield antenna, this characteristic causes the problem that the radio cannot receive sufficient gain in a particular frequency zone or band, which results in inconvenience in receiving radio broadcast waves steadily.

One practical way to resolve this problem is to provide a plurality of antenna wires which have different lengths so as to provide a wide range and highly sensitive receiving characteristic. But, if these different length antenna wires are disposed in parallel on the windshield glass end, the antenna wires terminate in different positions in the longitudinal direction at some intervals. Particularly, shorter antenna wires look like they were cut off prematurely. As a result, the windshield antenna becomes unattractive.

The purpose of the present invention is to provide different length windshield antennas for realizing the wide range and highly sensitive receiving characteristics without losing attractiveness and with keeping the good look of the windshield glass.

SUMMARY OF THE PRESENT INVENTION

The present invention provides, to accomplish the above purpose, windshield wires which are disposed along the periphery of the windshield glass, wherein the windshield wires are laid out, arrayed or arranged in parallel. And, except for at least the longest antenna wire, each antenna wire has a dummy antenna wire on an extension line over a predetermined run. Each dummy antenna wire terminates at the same position in the longitudinal direction along the periphery of the windshield glass.

BRIEF DESCRIPTION OF THE DRAWINGS

The nature and advantages of the present invention will be made more apparent from the following description made with reference to the accompanying drawings in which:

FIG. 2 is a vertical view showing a windshield glass viewed from inside of the automotive vehicle;

DETAILED DESCRIPTION OF PREFERRED EMBODIMENT OF THE PRESENT INVENTION

Figure 1:
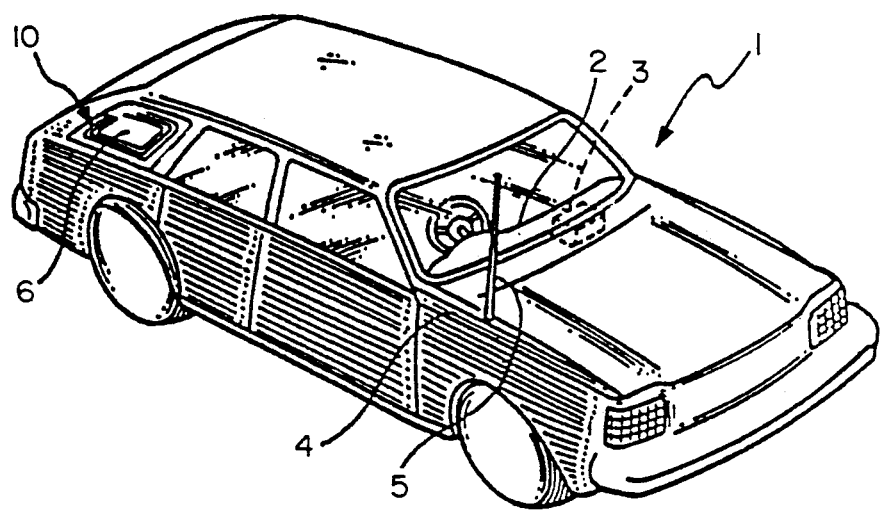
FIG. 1 is a schematic perspective view showing a part of an automotive vehicle provided with a windshield antenna in accordance with an embodiment of the present invention.

As shown in FIGS. 1-6, an automotive vehicle 1 is provided with a radio receiver 3 in an instrument panel 2 located in the front end of a passenger compartment room. For receiving radio broadcasts, a pole antenna 5 is provided on a front fender 4 and a windshield antenna 10 is provided somewhere in the rear portion of the vehicle body, such as, a right rear side windshield glass 6. A switching circuit 7 is provided to select the better antenna of these two antennas to perform a diversity receiving. In this specification the term windshield glass means any glassed portion of the body structure.

The windshield antenna 10 has three antenna wires 11, 12 and 13, and these antenna wires are disposed along the periphery of the windshield glass 6 in parallel at a distance or spacing of 5 mm from each other. Their base ends 11a, 12a and 13a are connected to a common feeder wire 15 via terminal 14. The common feeder wire 15 is connected to the radio receiver 3 through the switching circuit 7.

The windshield glass 6 which is disposed to close an opening of the vehicle body has a front end provided with hinges 31 and 32 and a rear end provided with a locking mechanism 33 so as to be hingedly supported to a body panel 34. That is, the hinges 31 and 32 and the locking mechanism 33 cooperate to slightly open the windshield glass 6 outwardly of the vehicle body (see phantom line in FIG. 6), or to completely close the windshield glass 6.

The body panel 34 consists of an outer panel 35 and an inner panel 36. The outer panel 35 and the inner panel 36 are connected at a periphery portion 34a which defines window opening. On the periphery portion 34a, there is provided a weather strip 37 which acts as a seal between the windshield glass 6 and the body panel 34 when the windshield glass 6 is closed. Numeral 38 is a trim or garnish which covers inside wall of the passenger compartment room.

Figure 4:
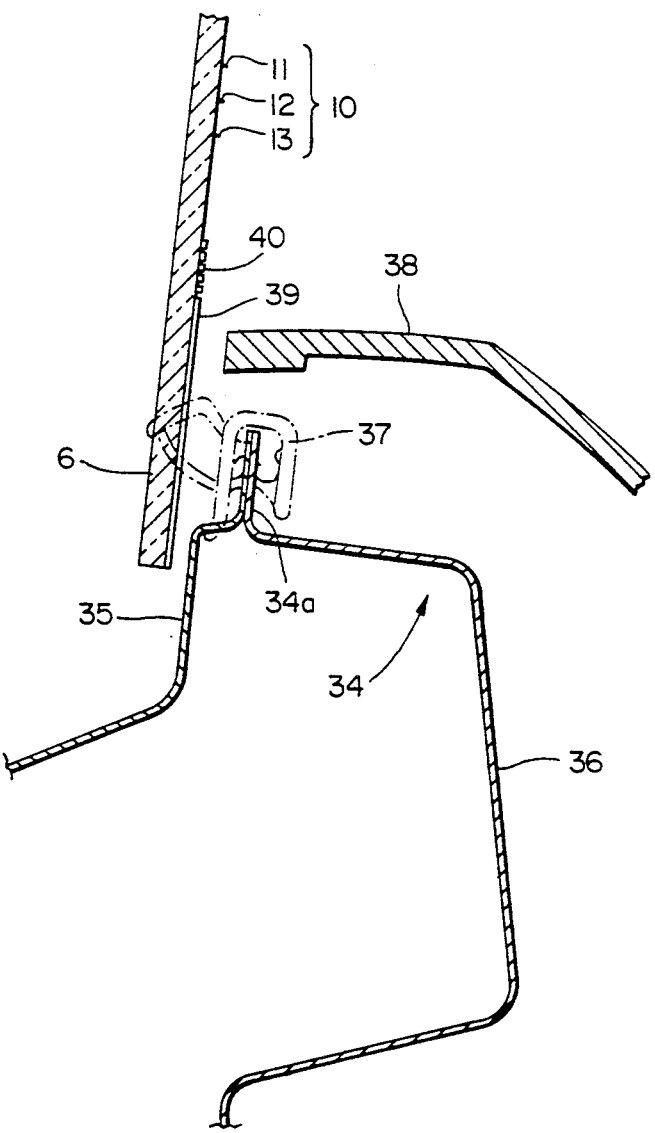
FIG. 4 is a cross-sectional view taken along a line B—B in FIG. 2.
Figure 5:
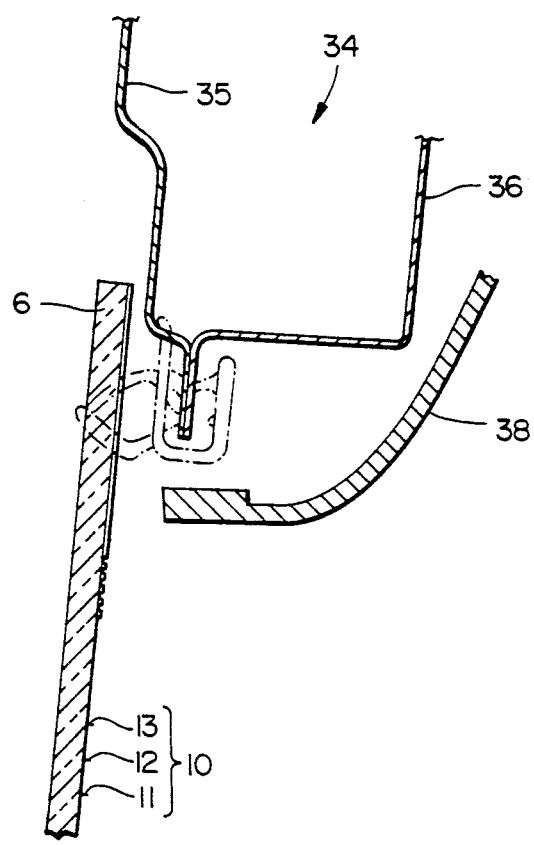
FIG. 5 is a cross-sectional view taken along a line C—C in FIG. 2.
Figure 6:
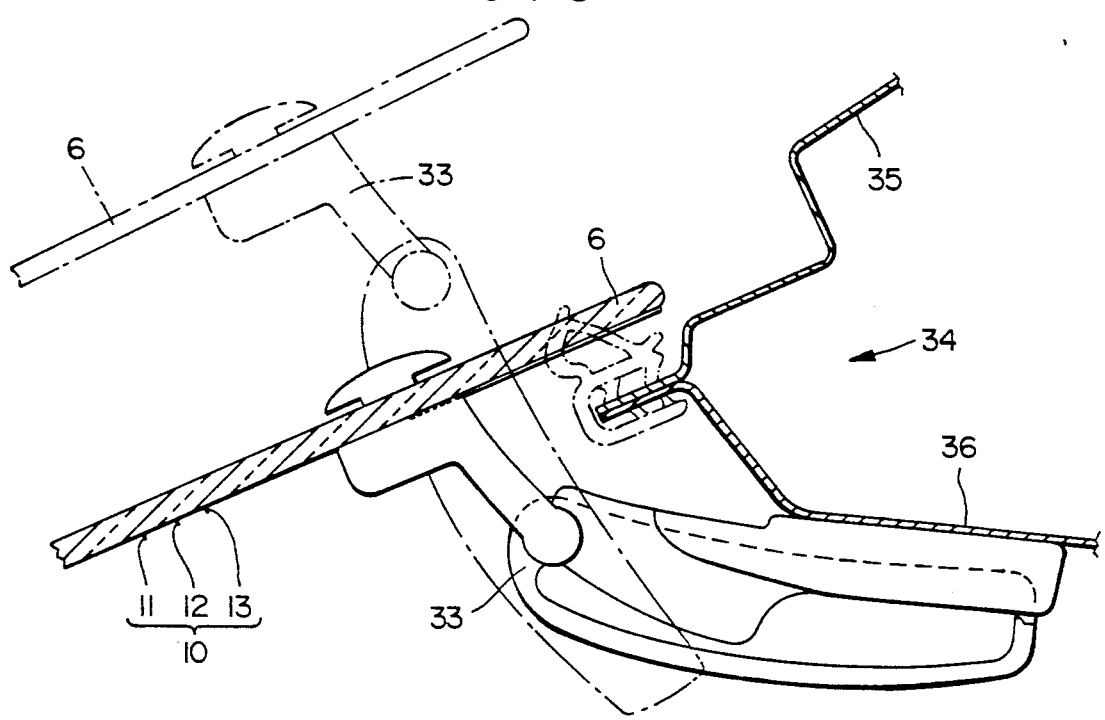
FIG. 6 is a cross-sectional view taken along a line D—D in FIG. 2.
Figure 8A:
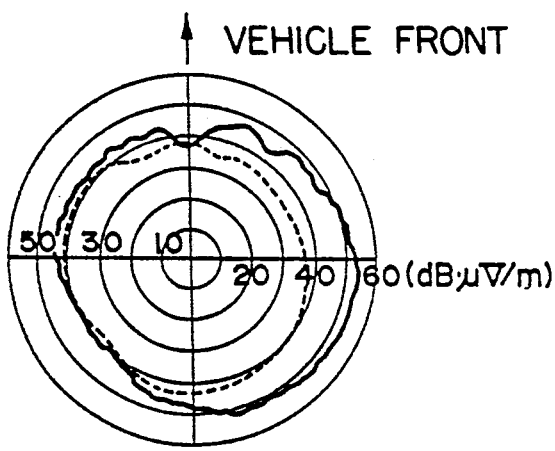
FIGS. 8a, 8b and 8c are a series of graphs showing test results with respect to the ability of the antenna of the present invention.
Figure 8B:
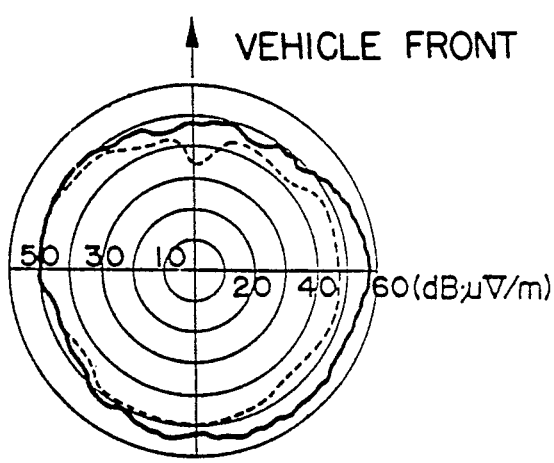
Figure 8C:
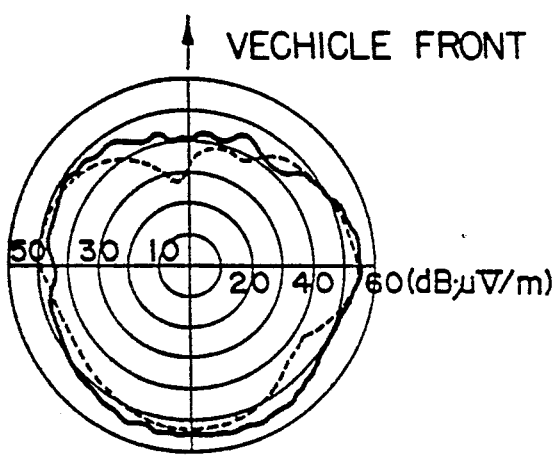

The windshield glass 6 has an insulated coated periphery 39 coated by black paint including ceramic, and an insulated inner coated periphery 40 having a width of 8 mm beside the periphery 39 coated by dotted black paint including ceramic (See FIG. 4).

The coated periphery 39 is located so as to conceal the weather strip 37 and a part of the outer panel 35 adjacent to the weather strip 37 or the inner panel 36. On the other hand, antenna wires 11, 12 and 13 are located not to overlap with a vehicle body panel 34 in a direction perpendicular to the plane of the windshield glass. Also, the antenna wires 11, 12 and 13 are disposed to be separated or spaced more than 20 mm from the vehicle body panel 34.

The antenna wire 13 is located inside of the inner coated periphery 40 separated at a distance of 15 mm in the front, upper and lower sides thereof, and at a distance of 40 mm in the rear side thereof on the inner plane of the windshield glass 6.

The three antenna wires 11, 12 and 13 are designed to be different from one another, i.e., the first antenna wire 11 being the longest among the three with a length of 1615 mm along the periphery of the windshield glass 6. The terminal end 11b faces to the base end 11a with a gap of 5 mm. The second antenna wire 12 and the third antenna wire 13 have lengths of 1590 mm and 1520 mm, respectively. As a result, the terminal ends 11b, 12b and 13b are positioned at different points separated from one another with some distances along the periphery of the windshield glass 6, which causes a poor or bad look and is grossly unattractive.

In the present invention, however, dummy antenna wires 22 and 23 are provided on the extension lines of the second and the third antenna wires 12 and 13, separated or spaced from the terminal ends 12b and 13b thereof, respectively, in order to obtain a good look of the windshield antenna 10. The distances between the terminal ends 12b, 13b and the dummy antenna wires 22, 23 equal 5 mm.

The dummy antenna wires 22 and 23 are disposed parallel to the first antenna wire 11, and terminate at terminal ends 22b and 23b so as to face the base ends 12a and 13a at a distance of 5 mm, respectively. In other words, the terminal ends 11b, 22b and 23b and the base ends 11a, 12a and 13a are evenly disposed with an equal gap between them.

Figure 7:
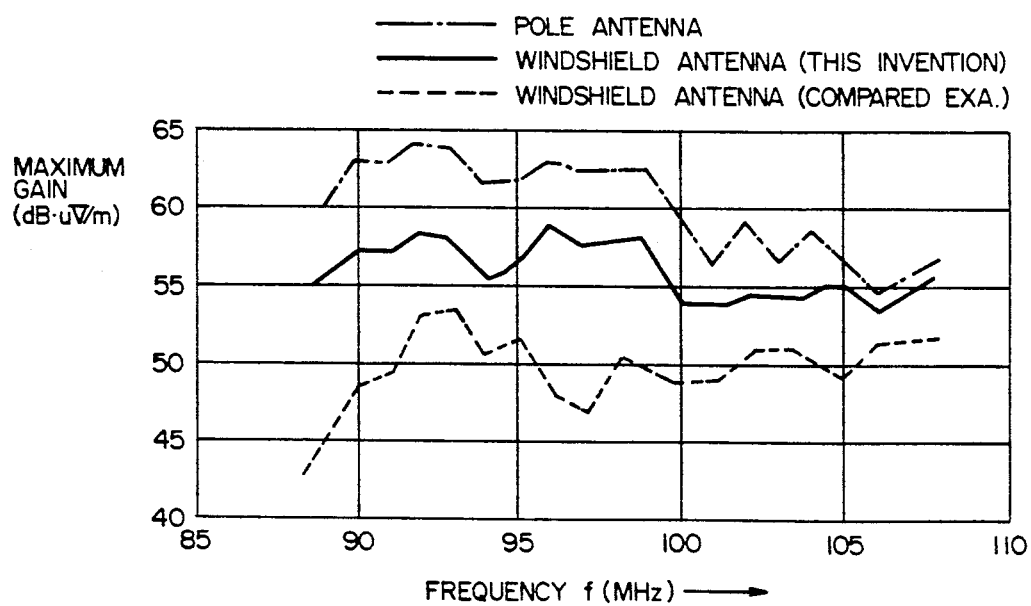
FIG. 7 is a graph illustrating the relationship of maximum gain versus signal frequency.
Figure 3:
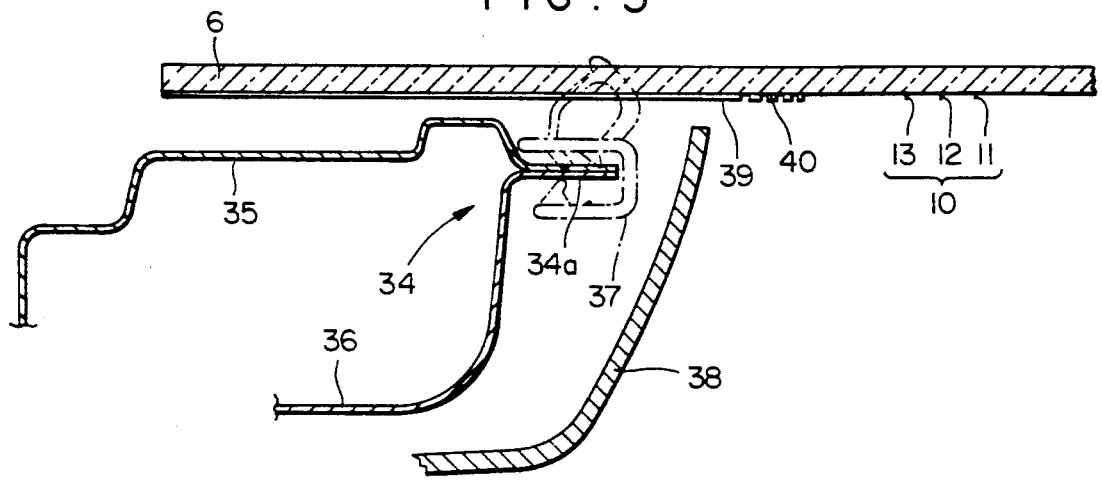
FIG. 3 is a cross-sectional view taken along a line A—A in FIG. 2.

In order to investigate the sensitivity characteristics of the antenna in accordance with the present invention, a sensitivity test was performed to compare the antenna of the present invention with another windshield antenna having one antenna wire of 1450 mm. In this test, maximum gains of each antenna were measured by changing the frequency of broadcast waves from 88 MHz to 108 MHz. The test results are shown in FIG. 7. The dotted line illustrates the result of the windshield antenna of 1450 mm, showing that the antenna has relatively high maximum gain in a frequency zone of 91 MHz to 95 MHz but has lower maximum gain in the remaining frequency band or zone. The results mean that this antenna may cause trouble in receiving radio broadcast waves of above low maximum gain in mountain areas or high-rising building areas.

On the other hand, in the case of the present invention, the result is shown by a solid line in FIG. 7 where maximum gains are superior compared to another windshield antenna at all frequencies. Also the maximum gains are relatively stable without steep fluctuation, which realizes a steady or uninterrupted receiving of radio broadcast waves. The chain or dot-dash line in FIG. 7 shows the result of a pole antenna.

Also, in order to investigate the effect of radio broadcast wave direction, a further test was performed. Some representative results about each frequency of 88 MHz, 98 MHz and 108 MHz are shown in graphs of FIGS. 4a, 4b and 4c, respectively. As is apparent from these graphs, the results show that the present invention (a solid line in the graphs) is superior to the compared windshield antenna (a dotted line in the graphs), i.e., the present invention brings higher sensitivity to the windshield antenna about all directions of radio broadcast waves, and realizes stable receiving capable of eliminating temporary interruption of receiving due to change of the broadcast wave direction.

Although the invention has been described with respect to a preferred embodiment, changes and modifications which do not depart from the inventive concepts taught herein are deemed to fall within the purview of the invention.

I claim:

1. A windshield antenna for an automotive vehicle having a windshield glass comprising
    a plurality of antenna wires disposed along a periphery of the windshield glass of the vehicle, said antenna wires having different lengths being located in parallel and having respective base ends for connection to a common feeder wire and respective terminal ends, the terminal ends being located at different positions along the periphery of the windshield glass of the vehicle;
    dummy wire means disposed in parallel with a longest of the antenna wires and extending in a direction along the periphery of the windshield glass for compensating the difference in length of the antenna wires, said dummy wire means being un-connected with said antenna wires;
    said dummy wire means being located on extension lines of said antenna wires except for at least the longest antenna wire;
    one end of said dummy wire means being located adjacent to the respective terminal ends of the antenna wires other than the longest one of said antenna wires and separated therefrom by a predetermined gap; and,
    the other end of said dummy wire means terminating at the same terminal position as the longest one of the antenna wires, in the direction along the periphery of the windshield glass.

2. A windshield antenna for an automotive vehicle in accordance with claim 1, wherein said periphery of the windshield glass is provided a coating coated by a dark color.

3. A windshield antenna for an automotive vehicle in accordance with claim 2, wherein said antenna wires and said dummy wire means are disposed inside of said coating on a plane of the windshield glass.

4. A windshield antenna for an automotive vehicle in accordance with claim 3, wherein said coating conceals a weather strip provided on a peripheral portion of a window opening of the vehicle.

5. A windshield antenna for an automotive vehicle in accordance with claim 3, wherein a dotted pattern coating is provided between said coating and said antenna wires.

6. A windshield antenna for an automotive vehicle in accordance with claim 3, wherein said antenna wires are spaced a predetermined distance from said dark coating.

7. A windshield antenna for an automotive vehicle in accordance with claim 1, wherein said dummy antenna wire means terminates adjacent to the base ends of said antenna wires.

8. A windshield antenna for an automotive vehicle in accordance with claim 7, wherein said dummy wire means terminates at a distance of 5 mm from the base ends of said antenna wires.

9. A windshield antenna for an automotive vehicle in accordance with claim 1, wherein said antenna wires are located not to overlap with a vehicle body panel in a direction perpendicular to the plane of the windshield glass.

10. A windshield antenna for an automotive vehicle in accordance with claim 9, wherein said antenna wires are spaced at least 20 mm from the vehicle body panel.

11. A windshield antenna for an automotive vehicle in accordance with claim 1 wherein said windshield antenna is provided on a side windshield glass.

12. A windshield antenna for an automotive vehicle in accordance with claim 11, wherein said side windshield glass is hingedly supported to slightly open outwardly.

13. A windshield antenna for an automotive vehicle in accordance with claim 1, further including a diversity receiving means for selecting one of said antenna wires.

14. A windshield antenna for an automotive vehicle in accordance with claim 13, wherein said diversity receiving means is selectively connected to said windshield antenna or a pole antenna.

15. A windshield antenna for an automotive vehicle in accordance with claim 1, wherein said antenna wires are separated from each other by a distance of 5 mm.

* * * * *